G. H. SCANLAN.
TRACTOR.
APPLICATION FILED APR. 3, 1919.
1,324,694.
Patented Dec. 9, 1919.
3 SHEETS—SHEET 2.
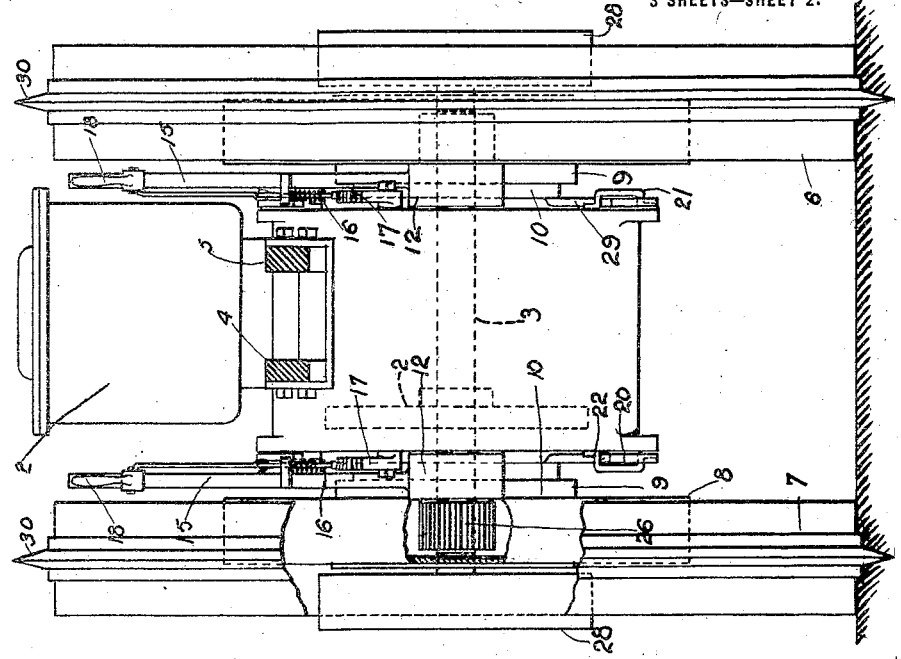
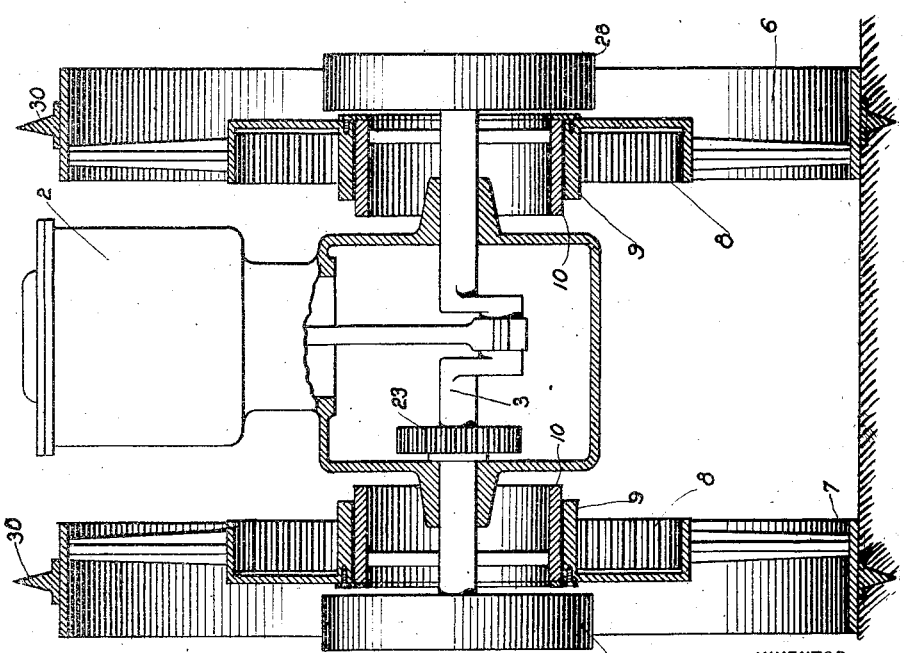
WITNESSES
INVENTOR
G. H. SCANLAN
BY
ATTORNEYS

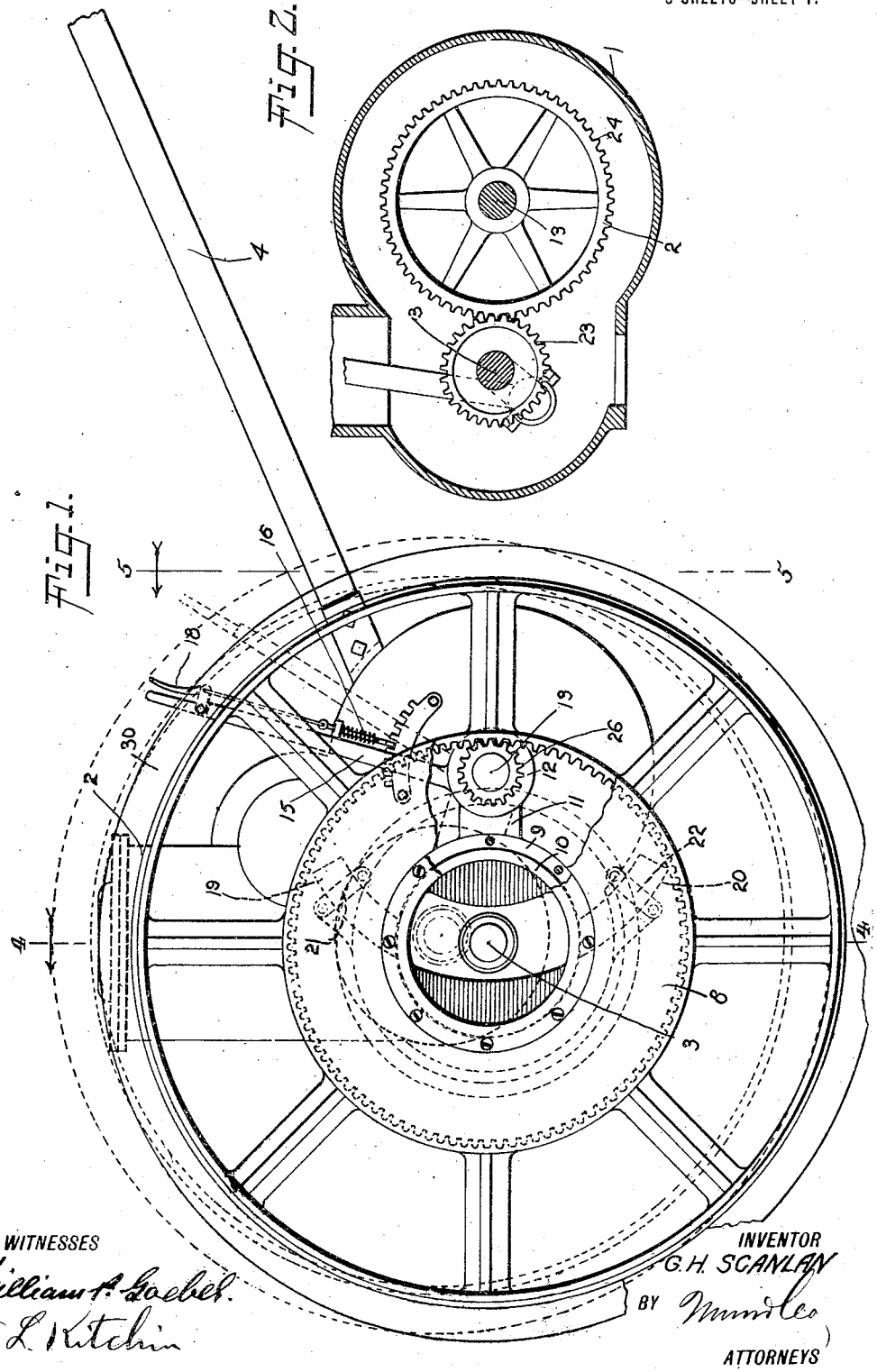

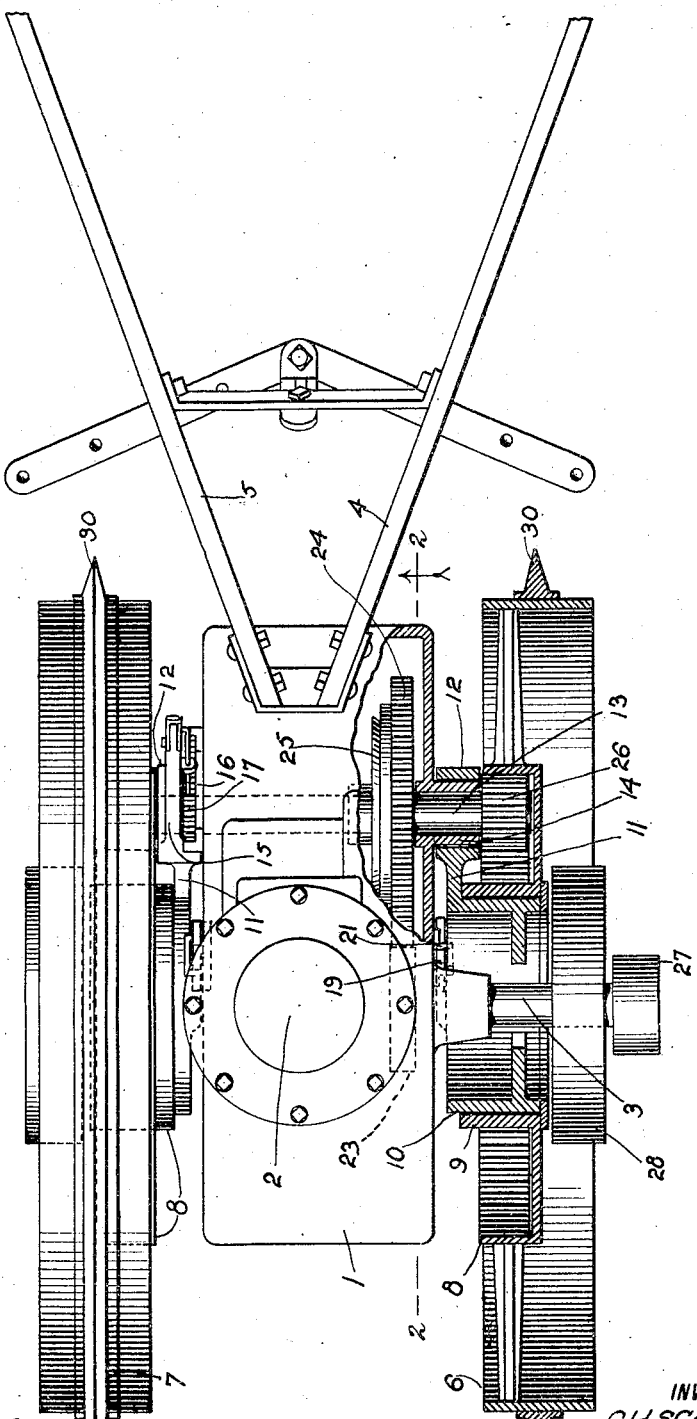

UNITED STATES PATENT OFFICE.

GEORGE H. SCANLAN, OF NEW YORK, N. Y.

TRACTOR.

1,324,694.  Specification of Letters Patent.  Patented Dec. 9, 1919.

Application filed April 3, 1919. Serial No. 287,224.

*To all whom it may concern:*

Be it known that I, GEORGE H. SCANLAN, a citizen of the United States, and a resident of the city of New York, borough of Manhattan, in the county and State of New York, have invented a new and Improved Tractor, of which the following is a full, clear, and exact description.

This invention relates to tractors, and has for an object the provision of an improved construction which may be used in connection with any sized tractor and which will adapt the tractor to different kinds of work by a quick easy adjustment.

Another object of the invention is to provide a tractor with means for raising and lowering the bull wheels independently or simultaneously.

A still further object of the invention is to provide a tractor with an improved bearing for the bull wheels and associate parts whereby the bearing may be raised or lowered without interfering with the crank shaft of the engine.

A further object is to provide a comparatively small two wheel machine self-propelled, but provided with handle bars for guiding and controlling purposes, the construction being particularly adapted for use in gardening as it is preferably made of a width to go between rows of vegetables while being under control of an operator at all times.

A further object of the invention is to provide a light traction machine which may not only be used as a tractor, but may have either or both of the bull wheels lowered or raised and may be held stationary and act as a stationary engine for furnishing power for light work, such as operating a pump, saw or the like.

In the accompanying drawings:

Figure 1 is a side view of a tractor disclosing an embodiment of the invention, certain parts being broken away for better illustrating the construction.

Fig. 2 is a fragmentary sectional view through Fig. 3 on line 2—2.

Fig. 3 is a top plan view of the structure shown in Fig. 1 with certain parts broken away.

Fig. 4 is a sectional view through Fig. 1 on line 4—4.

Fig. 5 is a front elevation of the construction shown in Fig. 1, same being taken on line 5—5 of Fig. 1.

Referring to the accompanying drawings by numerals, 1 indicates a casing and 2 an internal combustion engine of any kind, the same being provided with a single cylinder and connection to the crank shaft 3 (Fig. 4) for operating the same when set in motion. A pair of handles 4 and 5 are connected by any suitable means with the casing 1 so as to act as steering and controlling means for the tractor. Arranged on each side of casing 1 are bull wheels 6 and 7, each of these bull wheels is provided with an internal gear 8 which acts as a form of hub and which merges into the hub section 9 fitting against the cylindrical member 10 which acts as an axle for the hub, said cylindrical member having an arm 11 merging into a bearing section 12 through which the auxiliary driving shaft 13 extends. The bearing section 12 also loosely surrounds the sleeve 14 extending from casing 1 so as to properly support the casing without coming in contact with the shaft 13. This construction and arrangement causes the weight of the casing 1 and associate parts including the engine to be transmitted to the tubular member or axle 10 through the arm 11. In order to prevent the casing 1 from dropping down special means have been provided for holding the same at any desired height in respect to the bull wheels 6 and 7. It will be understood that these bull wheels and associate parts are of identical construction so that the description of one will equally apply to both.

In providing means for preventing any up or down movement of the bull wheels in respect to the casing, or the casing in respect to the bull wheels a lever 15 is formed integral with the bearing portion 12 or rigidly secured thereto as indicated in Fig. 1, said lever carrying a catch 16 which is designed to engage any of the teeth of the rack 17 secured to the casing 1. A suitable hand member 18 is provided for disengaging the catch 16 whenever desired for shifting the same to some other notch. It will be observed that the arm 11 and the tubular member or axle 10 is swung around the sleeve 14 when the lever 15 is moved whereby the bull wheel may be raised or lowered, or rather the casing 1 is raised or lowered, which has the same effect. If the machine is running along on level ground and it should be desired to use the machine with one wheel in a furrow one of the levers 15 is swung over to the desired position which will either raise or lower the tubular member or axle 10 in respect to the casing 1 so that the bull wheel will be also raised or lowered in respect to the casing and in the present instance it will be lowered so as to engage the bottom of the furrow while the other bull wheel engages the upper surface of the ground. This arrangement will maintain the casing 1 in its proper horizontal position and will also maintain the crank shaft 3 in its usual horizontal position. By operating both of the levers 15 simultaneously the casing 1 may be raised or lowered as desired so as to act as a driving mechanism swung low or as a driving mechanism swung high, thereby arranged to accommodate vegetables which have reached some considerable growth.

In order to help guide and maintain the parts in proper position the tubular member or axle 10 is provided with arc-shaped projections 19 and 20 preferably formed integral with the tubular member 10 and extending loosely through the straps 21 and 22 secured to the casing 1 whereby as the axle 10 is raised or lowered these parts may freely slide, but may act as guiding means for guiding the movement of the axle and also as means for maintaining a proper alinement of the various parts.

In order that the engine 2 may drive the bull wheels 6 and 7 a gear wheel 23 is rigidly secured to the crank shaft 3, said gear wheel meshing with the comparatively large gear wheel 24 which may be rigidly secured to the shaft 13 so as to drive the same, or may be loosely mounted thereon and connected therewith through a suitable clutch 25. Whenever power is transmitted to shaft 13 it rotates the pinions 26 which are rigidly secured thereto and which are in mesh with the teeth of the internal gear 8 whereby a rotary movement is transmitted to the bull wheels for propelling the machine. When it is desired to use the machine as merely a stationary power plant the clutch 25 is disengaged and the engine continued to operate. A pulley 27 is secured to the crank shaft 3 near one end so that when the engine is being operated as a stationary engine power may be transmitted from pulley 27 to a pump or other device to be operated. In order to assist in causing the engine to act in a proper manner either one or two fly wheels 28 may be secured to the crank shaft 3, there being one shown near each end in the drawing.

By this construction and arrangement of parts the machine may be used in cultivating vegetables or other growing crops on a substantially even surface or may be used for plowing where one bull wheel is in a furrow and consequently lower than the other. In addition it will be observed that the bull wheels are raised and lowered without respect to the crank shaft while allowing the crank shaft to extend beyond the bull wheels in order that the engine may be freely cranked at any time outside of the bull wheels. By arranging the parts in the manner set forth the casing of the engine acts as the frame of the machine so that the parts are reduced to a minimum, while the construction is flexible of adjustment for producing any of the desirable results sought in tractors of this type.

When using the structure for plowing a sharp cutting member 30 is preferably provided. This member may be a ring with a radiating cutting web as shown in the drawing, or may be made in a plurality of members so as to act as knives or projections to cut a slice or groove in the center or substantially in the center of the furrow and thereby act as a sub-soiler and thus breaks the crust below the line of the first furrow and thereby permits the moisture to freely pass. It will be noted that this ring provides a cut which will loosen up the soil below the furrow, but will not stir up the soil. The member 30 may be bolted, riveted or otherwise placed on the bull wheels, but if the structure is to be used for both plowing and cultivating preferably this member is removably held in place, as for instance by bolts so that it may be removed when not desired, and the bull wheels used merely as smooth surface wheels, or any suitable form of gripping member may be provided.

What I claim is:

1. A tractor of the character described, comprising an engine, a casing for supporting the engine, a crank shaft extending through the casing an appreciable distance on each side, a bull wheel arranged on each side of the casing formed with a comparatively large opening in the center through which said crank shaft extends, means for supporting said casing on said bull wheels while allowing an adjustment of the bull wheels vertically independently of the crank shaft, means for connecting the engine with the bull wheels, and means for adjusting the bull wheels substantially vertically in respect to said casing.

2. A tractor comprising an engine, a casing for the engine, a crank shaft extending an appreciable distance on each side of the casing, a bull wheel on each side of the casing provided with a comparatively large central opening through which the crank shaft extends, the relative size of the openings of the bull wheels and the crank shaft being such as to allow an appreciable up and down adjustment of the bull wheels independently of the crank shaft, means for adjustably mounting the bull wheels on said casing, and means for connecting the engine with the bull wheels whereby the engine may drive said wheels.

3. A tractor of the character described, comprising an engine casing, an engine mounted in the casing, a crank shaft connected with the engine and extending an appreciable distance on each side of the casing, a bull wheel arranged on each side of the casing provided with a comparatively large central opening through which the crank shaft extends, said opening being of such size as to permit an appreciable up and down movement of the bull wheels independently of the crank shaft and said casing, a bearing member or axle journaled in each of said openings, an extension projecting from each of said bearing members or axles, means for pivotally mounting said extensions on said casing, means for swinging said axles around said pivotal mounting for adjusting the relative position of the bull wheels in respect to the casing, and means for connecting said engine with said bull wheels so the engine will drive the bull wheels.

4. A structure of the character described, comprising an engine, a casing therefor, a crank shaft connected with the engine and extending an appreciable distance beyond the casing, a pair of bull wheels having a comparatively large opening centrally through which the crank shaft extends, an internal gear arranged on each of the bull wheels exteriorly but concentric with said openings, a tubular portion or axle rotatably fitted into each of said openings, each of said axles having an arm fitted in said opening, a tubular stub fitting into said casing on each side projecting through said arms whereby said axles are pivotally mounted on said casing, a manually operated member connected on each of said arms for swinging said axles around said tubular stub shafts and thereby independently adjusting the bull wheels, said adjustment being also independent of said crank shaft, a pinion meshing with each of said internal gears, a shaft extending through said casing connected to both of said pinions, and means for connecting said shaft with said engine for driving the bull wheels regardless of their adjusted position.

5. A tractor of the character described, comprising a casing, an engine mounted in the casing, a crank shaft connected with the engine extending on each side of the casing, a bull wheel mounted on each side of said casing, said crank shaft extending through said bull wheels, an axle for each of the bull wheels pivotally connected with the casing an appreciable distance from the crank shaft, means for swinging each of the axles on their pivotal mounting and locking the axles in any of their adjusted positions, and means for connecting the engine with the bull wheels for driving the bull wheels regardless of any of their adjusted positions.

6. A tractor of the character described, comprising a casing, an engine arranged in the casing, a crank shaft connected with the engine and extending on each side of the casing, a bull wheel arranged on each side of the casing, each of said bull wheels being provided with an internal gear having an annular web substantially parallel to the side of the bull wheel and a tubular bearing member extending axially of the bull wheels, an axle for each of the bull wheels formed with a tubular portion fitting the tubular bearing member, an arm extending to one side, a supporting shaft extending from said casing for each of said arms whereby the axles are pivotally connected with the casing at one side of the center of the bull wheel, a manually operated lever connected with each of the axles for swinging the same around their respective pivotal mountings, means for locking the respective bull wheels in any of their adjusted positions, and means for continually maintaining a driving connection between said internal gear and said engine.

7. A tractor of the character described, comprising a casing, an engine arranged in the casing, a bull wheel arranged on each side of the casing formed with a comparatively large central opening, a crank shaft for the engine extending through the casing and through the openings in said bull wheels whereby the engine may be cranked from a point exteriorly of the bull wheels, an axle for each of the bull wheels fitting into the respective openings, each of said axles having an arm extending in a plane substantially parallel to the bull wheels, means for pivotally connecting the ends of said arms to said casing, means for swinging said axles around the pivotal mounting of said arms for adjusting vertically the bull wheels, and means for connecting the engine with the bull wheels for driving purposes.

8. A tractor of the character described comprising a casing, an engine arranged in the casing, a crank shaft connected with the engine and extending on each side of the casing, a bull wheel arranged on each side of the casing having an opening through which said crank shaft extends, said crank shaft extending a sufficient distance beyond the bull wheel for receiving a pulley, a cranking member, each of said bull wheels being provided with an annular gear, an axle for each of the bull wheels, an arm connected with each of said axles extending to one side, a supporting shaft extending through said casing for each of said arms whereby the axles are pivotally connected with the casing at one side of the center of the bull wheels, a manually operated lever connected with each of said axles for swinging the same around their pivotal mountings, means for locking the respective bull wheels in any of their adjusted positions, and means for continually maintaining a driving connection between said internal gear and said engine.

9. A tractor of the character described comprising a casing, an engine arranged in the casing, a crank shaft connected with the engine and extending on each side of the casing, a bull wheel arranged on each side of the casing having a central opening through which said shaft extends, a fly wheel connected to each end of the shaft, said fly wheels being positioned substantially within the bull wheels, an internal gear connected with each of said bull wheels, means for providing a driving connection between said gear and said engine, and a support for the bull wheels connecting the same with said casing, said support being formed to permit a free rotation of the bull wheels while maintaining same positioned eccentrically in respect to the crank shaft.

10. A tractor of the character described comprising a casing, an engine arranged in the casing, a crank shaft connected with the engine and extending on each side of the casing, a bull wheel arranged on each side of the casing, each of said bull wheels being provided with an internal gear, a tubular bearing member extending axially of the bull wheels, an axle for each of the bull wheels formed with a tubular portion fitting the tubular bearing member, an arm on each bull wheel extending to one side, supporting shafts extending from said casing projecting through said arms for supporting said arms whereby the axles are pivotally connected with the casing at one side of the center of the bull wheels, said crank shaft extending through the bull wheels and a short distance therebeyond, and a pulley connected with said crank shaft close to the crank shaft bearing with the pulley extending slightly beyond the edge of the bull wheels, the arrangement of the bull wheels on said arms maintaining the bull wheels close to the tractor.

11. A tractor of the character described comprising a casing, an engine arranged in the casing, a pair of bull wheels, a crank shaft extending through the casing and through the bull wheels, means for journaling the bull wheels on said casing independent of the crank shaft, means for maintaining a driving connection between the bull wheels and the engine, and a pulley mounted on said crank shaft beyond the bull wheels in such a position that a belt may extend at any angle free of the bull wheels.

GEORGE H. SCANLAN.